United States Patent
Benesch et al.

(10) Patent No.: US 10,545,566 B2
(45) Date of Patent: Jan. 28, 2020

(54) SWITCH MODE POWER SUPPLY UNIT HAVING A WEB INTERFACE

(71) Applicant: Siemens Aktiengesellschaft, Munich (DE)

(72) Inventors: Karl Benesch, Waidhofen/Ybbs (AT); Miroslav Vucic, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/320,139

(22) PCT Filed: Jun. 24, 2015

(86) PCT No.: PCT/EP2015/064249
§ 371 (c)(1),
(2) Date: Dec. 19, 2016

(87) PCT Pub. No.: WO2015/197689
PCT Pub. Date: Dec. 30, 2015

(65) Prior Publication Data
US 2017/0123481 A1 May 4, 2017

(30) Foreign Application Priority Data
Jun. 25, 2014 (EP) .................................. 14173908

(51) Int. Cl.
*G06F 1/32* (2019.01)
*G06F 1/3287* (2019.01)
(Continued)

(52) U.S. Cl.
CPC .............. *G06F 1/3287* (2013.01); *G06F 1/12* (2013.01); *G06F 1/266* (2013.01); *G06F 1/3296* (2013.01)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 7,181,517 B1 * 2/2007 Iavergne ................. H04L 41/22
700/286
9,952,565 B2 * 4/2018 Liu ........................ G05B 13/02
(Continued)

FOREIGN PATENT DOCUMENTS

| CN | 1833207 | 9/2006 |
| DE | 102 43 782 A1 | 3/2004 |
| WO | WO 2005/015328 A1 | 2/2005 |

*Primary Examiner* — Zahid Choudhury
(74) *Attorney, Agent, or Firm* — Cozen O'Connor

(57) ABSTRACT

A switch mode power supply unit having a plurality of output channels and a web interface for connection to a communications network, where the switch mode power supply unit includes a real time Ethernet controller which is connected to a control of the switch mode power supply unit and is equipped as a web server such that a plurality of operating parameters of the switch mode power supply unit can be set and/or displayed in real time via the web interface such that the switch mode power supply unit can be configured and monitored via the communications network, while ensuring that any changes to the configuration are immediately effective.

16 Claims, 2 Drawing Sheets

(51) Int. Cl.
*G06F 1/12* (2006.01)
*G06F 1/26* (2006.01)
*G06F 1/3296* (2019.01)

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | | |
|---|---|---|---|
| 2004/0098143 A1 | 5/2004 | Fehrer et al. | |
| 2009/0006649 A1* | 1/2009 | Yoshimura | G06F 17/30893 709/245 |
| 2009/0313549 A1* | 12/2009 | Casner | B23K 9/0953 715/740 |
| 2010/0039043 A1* | 2/2010 | Wacknov | H05B 37/0254 315/291 |
| 2011/0153786 A1 | 6/2011 | Merkel et al. | |

* cited by examiner

SWITCH MODE POWER SUPPLY UNIT HAVING A WEB INTERFACE

CROSS-REFERENCE TO RELATED APPLICATIONS

This is a U.S. national stage of application No. PCT/EP2015/064249 filed 24 Jun. 2015. Priority is claimed on European Application No. 14173908 filed 25 Jun. 2014, the content of which is incorporated herein by reference in its entirety.

BACKGROUND OF THE INVENTION

1. Field of the Invention

The invention relates to a switch mode power supply unit having a plurality of output channels and a web interface for connection to a communications network, and a method for operating the switch mode power supply unit.

2. Description of the Related Art

Switch mode power supply units having a plurality of output channels are used to supply different consumer loads simultaneously. In this case, each output channel can often be adjusted separately via a potentiometer or a DIP switch.

US 2010/0039043 A1 discloses a switch mode power supply unit having a plurality of output channels, which comprises a web interface for connection to a communications network. Settings can be made for each output channel via this web interface. Specifically, the switch mode power supply unit described is used to supply a lighting system, whereby different illumination scenarios can be stipulated via a web interface.

In industrial applications in the field of automation, particular demands are placed on switch mode power supply-units. For example, a flexible configuration is required to ensure a reliable power supply even after an industrial plant is modified.

Fail-safe operation also plays a particular role in industrial applications. It is therefore often necessary to respond rapidly to faults to prevent consequential damage in a plant. In this case, faults have to be identified at an early stage.

SUMMARY OF THE INVENTION

In view of the foregoing, it is an object of the invention to provide an improved switch mode power supply unit for use in industrial plants.

This and other objects and advantages are achieved in accordance with the invention by a switch mode power supply unit and a method, where the switch mode power supply unit comprises a real-time Ethernet controller that is connected to a controller of the switch mode power supply unit and is equipped as a web server, such that a plurality of operating parameters of the switch mode power supply unit can be set and/or displayed in real-time via the web interface. In this way, the switch mode power supply unit can be configured and monitored via the communications network, while ensuring that any changes to the configuration are effective immediately. Furthermore, faults are reported to a central point without delay, in order for the necessary action to be taken. Such action can, for example, be the selective shutdown of plant components, in order to prevent consequential damage. The real-time Ethernet controller is equipped as a web server. As a result, communication with the switch mode power supply unit takes place via a web browser. The web browser is, for example, installed in a computer, which is connected to the communications network. This computer forms the central point from which the switch mode power supply unit in accordance with the invention or a plurality of switch mode power supply units, can be configured and monitored. Apart from the web browser no other software is necessary to perform this function.

In an embodiment of the invention, the real-time Ethernet controller is configured to transmit data with clock synchronization. In such synchronized communication (real-time class 3) the process data is sent with maximum precision in accordance with an exact sequence stipulated during plant engineering (maximum permitted deviation from the start of a bus cycle is 1 µs). This optimized data transmission is also called IRT functionality (Isochronous Real-Time or clock synchronization). There are no delay times in this case.

In an advantageous embodiment of the invention, at least one input voltage and one input current can be displayed as operating parameters and an output voltage and a current limit can be set and/or displayed for each output channel. This type of switch mode power supply unit can be flexibly adapted to changed plant components via the web interface. Here, the input voltage and the input current are produced by a current supply network, to which the switch mode power supply unit is connected and from the loads connected on the output channels.

In addition, it is advantageous if, for each output channel, it is possible to use a web server to set whether a shutdown or a current limitation occurs when the current limit is reached. In this way, the response to a fault that occurs can be stipulated. When supplying capacitive consumer loads, a temporary current limitation may be expedient to charge existing capacities when powering up. In other cases, an immediate shutdown may be necessary to protect plant components supplied via a switch mode power supply unit.

In another embodiment, a power-on delay can be set for each output channel via the web server. Thus, by laying down different power-on delays, a sequence can be established when powering up a plurality of plant components. This can be expedient to avoid overloading the switch mode power supply unit. By providing remote access via the web interface, it is easily possible to optimize this configuration operation from one central point in a plurality of steps.

To be able to identify faults quickly in complex industrial plants, it is advantageous if an operating status can be displayed for each output channel via the web server. This ensures that each plant component supplied is monitored at a central point. Changes in the operating status of one channel or of a plurality of channels can be assessed immediately to derive appropriate actions.

For central monitoring of the input-side ports, it is advantageous if a device overload and/or a phase failure can be displayed via the web server.

The functional scope of the switch (c)ode power supply unit is conveniently increased in that each output channel can be shut down and activated separately via the web server. The channels of the switch mode power supply unit can then be used via the web interface from a central point as switches for shutting down and activating plant components.

In particular, it is convenient if each output channel can be reactivated via the web server after an overload shutdown. Following an error analysis based on centrally assessed data and, if applicable, a replacement of a faulty plant component; the corresponding output channel can be reactivated immediately in this way.

In an embodiment of the invention, the switch mode power supply unit comprises an expansion module, and at least one parameter of the expansion module can be set and/or displayed via the web server. In this case, it is convenient if the expansion module is a buffer module to bridge an interruption of supply and if a buffer time can be set and/or displayed by means of the web server. In the simplest case, an extended buffer time is predefined for an output channel, where the buffer times for the remaining channels are automatically cut accordingly.

In another embodiment, the expansion module comprises an additional output channel for supplying a further load.

All these expansion modules can be configured immediately from a central point, thereby further increasing the flexibility of the switch mode power supply unit in use.

Furthermore, it is advantageous if software installed in the controller of the switch mode power supply unit can be modified via the web server. In particular, when using a plurality of switch mode power supply units, it is especially efficient to perform software updates from a central point. This situation regularly prevails when supplying industrial plants.

It is also an object of the invention to provide a method for operating the described switch mode power supply unit by which a plurality of operating parameters of the switch mode power supply unit can be changed in real-time via the web server and by which the changed operating parameters can be displayed via the web server.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described by way of example, making reference to the accompanying figures, in which.

DETAILED DESCRIPTION OF THE EXEMPLARY EMBODIMENTS

Figure 1:
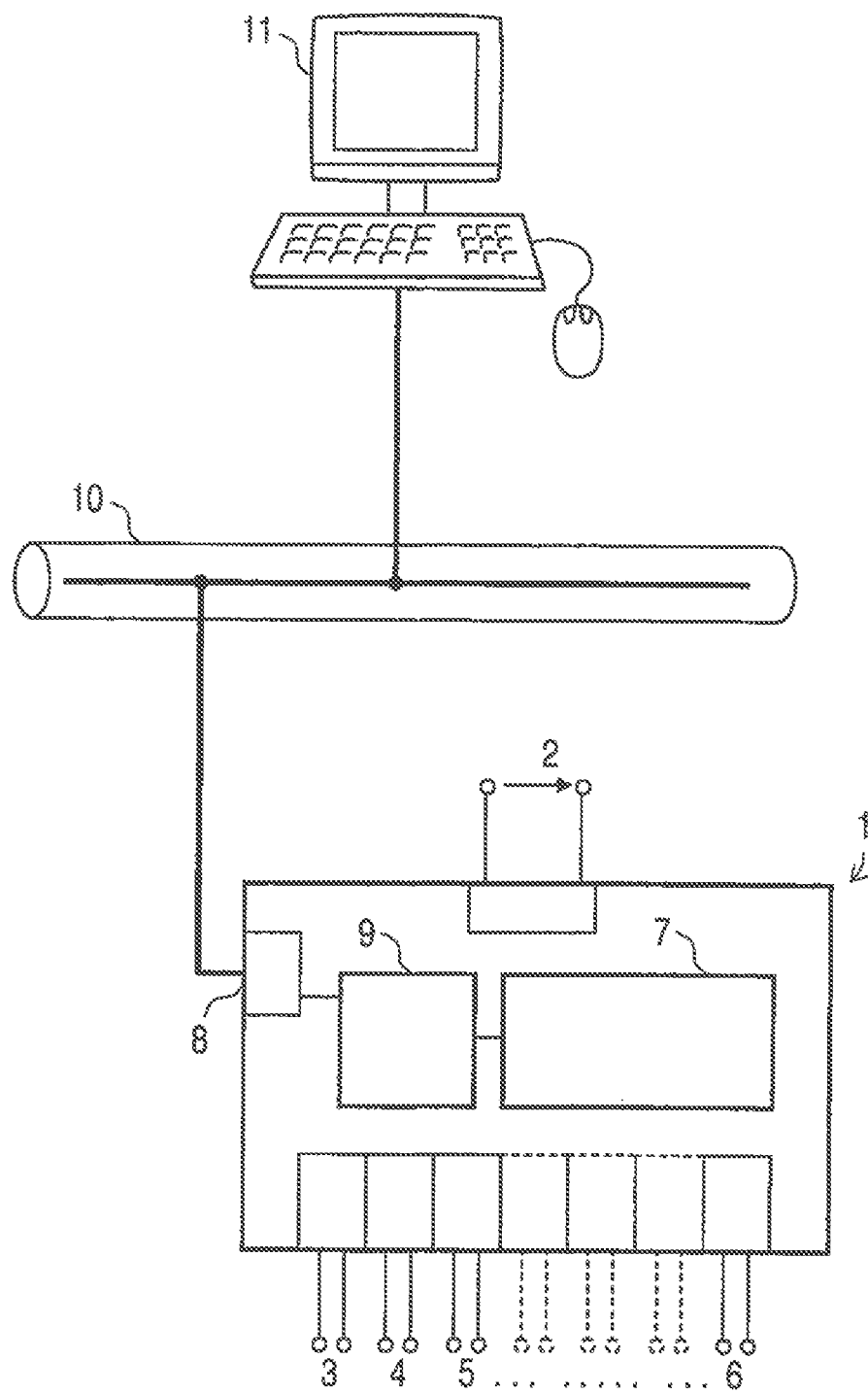
FIG. 1 is a schematic illustration showing a switch mode power supply unit in accordance with the invention.

FIG. 1 shows a switch mode power supply unit 1 which is connected to an input voltage 2 and which has a plurality of output channels 3, 4, 5, 6. A respective output voltage is present at each output channel 3, 4, 5, 6.

Each output channel 3, 4, 5, 6 is actuated via a controller 7. The power circuit breaker (not shown in detail) of the switch mode power supply unit 1 consists, for example, of an input-side rectifier, an intermediate circuit and a plurality of transformers. For example, a plurality of resonant transformers is connected to the intermediate circuit, the power circuit breakers of which are actuated via the controller 7.

By using a clocked activation and shutdown of the power circuit breakers, an intermediate circuit voltage is converted into an output voltage present at the respective output channel. Corresponding control algorithms are installed in the controller 7 for this purpose. The individual output voltages can be different or the same size. Furthermore, it is possible to switch two or more channels 3, 4, 5, 6 in parallel to provide a higher output power.

To set the desired output voltage for each output channel 3, 4, 5, 6, suitable control elements are preferably present on the device itself. In the simplest case, this is an adjusting screw.

Further setting options relate to a power limitation for each channel 3, 4, 5, 6, where this can also be set up in two stages. Two current limits are then predefined for each output channel 3, 4, 5, 6. When the first current limit is reached, operation in the overload range is possible for a predefined time span, for example, in order to charge output-side capacities. The current is not limited until a second current limit is reached. Here, it is expedient if the respective output channel 3, 4, 5, 6 shuts down after an adjustable time limit.

To set the current limits and the time spans, control elements can likewise be arranged on the device itself.

In the case of generic switch mode power supply units having a plurality of output devices, it is however considerably more advantageous to perform these configuration steps via a web interface 8. This is particularly the case when a plurality of switch mode power supply units 1 must be configured within an industrial plant.

In accordance with the invention, a real-time Ethernet controller 9 is therefore provided which, on the one hand, is connected to the controller 7 and, on the other hand, is connected to a web interface 8. In this case, the real-time Ethernet controller 9 is equipped as a web server. This ensures that the settings of the output voltages and the current values or time spans can be performed in real-time via a communications network 10 by a computer 11 upon which a web browser is installed. It is important that changes made are also displayed in real time in a view of the web browser.

The real-time Ethernet controller 9 is therefore conveniently installed for data transmission with clock synchronization. A controller that is suitable for this is the ERTEC 200 from the company Siemens, for example.

The communications network 10 is an Ethernet or PROFINET, for example, PROFINET uses TCP/IP and IT standards, has real-time Ethernet capability, and enables the integration of numerous field bus systems.

A significant advantage of the invention is that complex settings of the multi-channel power supply 1 can be performed from one central point easily and in real-time. These settings are then saved in the power supply 1 and are immediately available each time the power supply 1 is powered up again. Transmission in real-time also means that setting values can be saved centrally and can be read in via the web interface 8 during power-up.

A further advantage is that the status of the individual output channels 3, 4, 5, 6 can be displayed in real-time via the web browser. In addition to the settings made, error or interference messages are also displayed, such as when a current limit is exceeded. The real-time output enables automated evaluation, which, if applicable, can immediately result in corresponding protection measures, such as to shut down a plurality of output channels 3, 4, 6.

The central access to a plurality of switch mode power supply units 1 furthermore readily enables the switch mode power supply units 1 to be configured so as to correspond. For example, the same current limits are predefined via the web browser by inputting a value for all switch mode power supply units 1 installed in an industrial plant.

To further increase the flexibility of the range of applications, it is expedient to provide various expansion modules for the switch mode power supply unit 1. In the simplest case, this is an additional output channel, which is then actuated via an interface between basic device and expansion module by means of the controller 7. Thus, it is also possible to configure this type of expansion module via the web interface 8.

The invention also comprises a switch mode power supply unit 1 which is constructed from a basic device having control elements and a web device. The web device then comprises a separate housing with the real-time Ethernet controller 9, the web interface 8 and an interface to the controller 7 of the basic device. When a web device is connected, the basic device can be configured and monitored via the web browser. However, the switch mode power supply unit 1 functions even when a web device is disconnected, but only with saved setting values which can then be changed in a manual mode, if appropriate via the control elements of the basic device.

Figure 2:
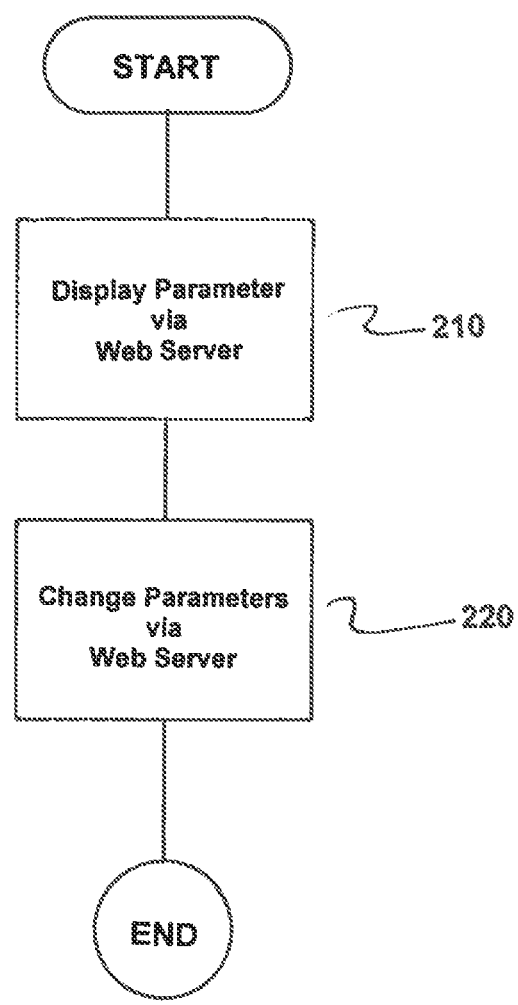
FIG. 2 is a flowchart of the method in accordance with the invention.

FIG. 2 is a flowchart of a method for operating a switch mode power supply unit. The method comprises changing a plurality of operating parameters of the switch mode power supply unit (1) in real-time via a web server, as indicated in step 210.

Next, the changed operating parameters of the plurality of operating parameters are displayed via the web server, as indicated in step 220.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A switch mode power supply unit comprising:
a plurality of output channels;
a web interface for connection to a communications network; and
a real-time Ethernet controller connected to a controller of the switch mode power supply unit, the real-time Ethernet controller being configured as a web server such that a plurality of operating parameters of the switch mode power supply unit is at least one of (i) settable and (ii) displayed in real-time via the web interface;
wherein an output voltage and a current limit is at least one of:
(i) set for each output channel of said plurality of output channels; and
(ii) displayed for each output channel for each output channel of said plurality of output channels; and
wherein an operating status is displayable in real-time for each output channel via the web server.

2. The switch mode power supply unit as claimed in claim 1, wherein the real-time Ethernet controller is configured for data transmission with clock synchronization.

3. The switch mode power supply unit as claimed in claim 1, wherein at least one input voltage and one input current can be displayed as operating parameters.

4. The switch mode power supply unit as claimed in claim 1, wherein at least one input voltage and one input current can be displayed as operating parameters.

5. The switch mode power supply unit as claimed in claim 3, wherein, for each output channel of said plurality of output channels, a web server is utilizable to set whether a shutdown or a current limitation occurs when the current limit is reached.

6. The switch mode power supply unit as claimed in claim 1, wherein a power-on delay is settable for each output channel of said plurality of output channels via the web server.

7. The switch mode power supply unit as claimed in claim 1, wherein an operating status is displayable for each output channel via the web server.

8. The switch mode power supply unit as claimed in claim 1, wherein at least one of a device overload and a phase failure is displayable via the web server.

9. The switch mode power supply unit as claimed in claim 1, wherein each output channel of said plurality of output channels is at least one of shut down or activated separately via the web server.

10. The switch mode power supply unit as claimed in claim 1, wherein each output channel of said plurality of output channels is reactivatable after an overload shutdown via the web server.

11. The switch mode power supply unit as claimed in claim 1, wherein the switch mode power supply unit comprises an expansion module; and wherein at least one parameter of the expansion module is at least one of (i) set and (ii) displayed via the web server.

12. The switch mode power supply unit as claimed in claim 11, wherein the expansion module comprises a buffer module which is configured to bridge a supply interruption; and wherein a buffer time is at least one of (i) settable and (ii) displayed via the web server.

13. The switch mode power supply unit as claimed in claim 11, wherein the expansion module comprises an additional output channel configured to supply a further load.

14. The switch mode power supply unit as claimed in claim 12, wherein the expansion module comprises an additional output channel configured to supply a further load.

15. The switch mode power supply unit as claimed in claim 1, wherein software installed in the controller of the switch mode power supply unit is modifiable via the web server.

16. A method for operating a switch mode power supply unit, the method comprising:
changing a plurality of operating parameters of the switch mode power supply unit in real-time via a real-time Ethernet controller configured as a web server;
displaying the changed operating parameters of said plurality of operating parameters via the real-time Ethernet controller configured as the web server; and
configuring the switch mode power supply unit based on the displayed operating parameters of said plurality of operating parameters to prevent consequential damage in an industrial plant;

wherein an output voltage and a current limit is at least one of:
  (i) set for each output channel of said plurality of output channels; and
  (ii) displayed for each output channel for each output channel of said plurality of output channels; and
wherein an operating status is displayable in real-time for each output channel via the web server.

\* \* \* \* \*